Figure 1:
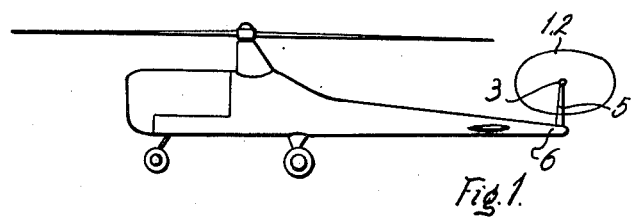

Feb. 15, 1955     H. C. J. FOCKE     2,702,084

AIRCRAFT OF THE HELICOPTER TYPE HAVING DUAL TAIL ROTORS

Filed May 20, 1952

Inventor

Henrick C. J. Focke
By Toulmin & Toulmin
Attys.

United States Patent Office 2,702,084
Patented Feb. 15, 1955

2,702,084

AIRCRAFT OF THE HELICOPTER TYPE HAVING DUAL TAIL ROTORS

Henrich Carl Johann Focke, Amsterdam, Netherlands, assignor to Ministerio da Aeronautica, Diretoria do Material, Rio de Janeiro, Brazil Application May 20, 1952, Serial No. 288,831

1 Claim. (Cl. 170—135.22)

The present invention relates to an improved flying machine particularly a helicopter of the type wherein the steering or control of the machine is effected by means of two engine-driven airscrews with adjustable blades, the axes of such screws being arranged in a V, i. e. intersecting one another so that by varying the pitch of the said screws, either for the two screws simultaneously or alternately, the requisite control can be exerted. Such an arrangement including the adjustable pitch feature is generally illustrated in my issued Patent 2,225,002, and a typical driving arrangement for the screws is also shown in the A. P. C. publication, A. Flettner, Serial Number 254,867, published May 25, 1947.

The construction of the fuselage necessary for this arrangement, with two outwardly diverging columns or branches serving as bearing for the screw axes, is not particularly favourable, and has the drawback that this rotating control system takes up much space in the transverse direction of the plane.

On the other hand it has been proposed to arrange two propellers while adequately choosing the number of blades, in such a way that the blades of one screw pass between those of the other, which makes it possible to place the hubs of such screws close together.

The invention is based on the conception that by the application of the latter measure—which is known per se—in the case of a rotating control gear as above referred to, the drawbacks involved therein may be completely eliminated.

In connection therewith, the invention provides for a flying machine particularly a helicopter, in which the steering or control of the machine is effected by means of two engine-driven airscrews having adjustable blades, the axes of such screws intersecting one another at a point closely adjacent the hubs of said air screws and characterized by such control or steering screws being so designed and arranged that the blades of one screw pass between those of the other screw.

In this construction, the bearing sleeves for the screw axes may therefore be placed close together, and in particular may project from a single column disposed in the vertical longitudinal central plane of the fuselage.

The two airscrews thus arranged when rotating may be said to describe two substantially great intersecting circles which in turn substantially define a sphere in space, from which, by relative variation of the pitch of the screws, a jet of air may be projected in any direction in a plane transverse to the longitudinal axis of the machine, for the creation of a thrust or steering impulse of any desired intensity and direction.

Figure 2:
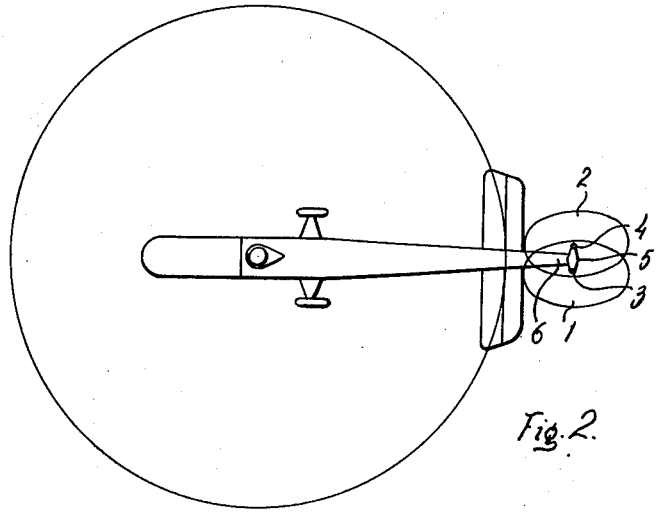

The invention will be hereinafter described with reference to the accompanying drawing, in which:

The Figures 1 and 2 show a diagrammatic side elevational and a plan view, respectively, of an aeroplane according to the invention.

Figure 3:
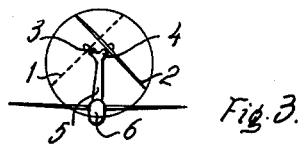

Fig. 3 is a rear elevational view on a somewhat enlarged scale, in which all the components of the aeroplane lying in front of the rotating control gear are omitted.

As may be seen from these figures, the means for controlling or steering the machine consist of two airscrews 1 and 2, the axes of which, arranged in a V at a substantial angle, are journalled in sleeves or hubs 3, 4, projecting from the top of a single common supporting column 5, which in the vertical longitudinal central plane of the machine is disposed on the tail end of the fuselage 6, and in which are accommodated the elements (not shown) for the transmission of the drive to the screw axes.

Each of the screws 1 and 2 has a number of blades—here there are two, for simplicity's sake—such that when the screws rotate, the blades of one screw pass between those of the other, as shown in Figures 2 and 3. From the latter figure it may be seen in particular that in the transverse direction of the aeroplane, the set of airscrews takes up much less space than in the known construction referred to, at the same time providing a more favourable construction and disposition of the airscrew hubs.

What I claim is:

In a helicopter flying machine having a tail structure, a support column upstanding vertically from said tail structure, two air screw support means in laterally spaced relationship on the upper end of said support column, an adjustable pitch air screw mounted on each of said screw support means for steering the flying machine, the axes of said air screws intersecting at a point closely adjacent the hub of each air screw and diverging upwardly at a substantial angle, the blades of one air screw passing between the blades of the other air screw.

References Cited in the file of this patent

UNITED STATES PATENTS

| | | |
|---|---|---|
| 2,225,002 | Focke | Dec. 17, 1940 |
| 2,521,012 | Kay et al. | Sept. 5, 1950 |

FOREIGN PATENTS

| | | |
|---|---|---|
| 846,646 | France | June 12, 1939 |

OTHER REFERENCES

Serial No. 254,867, A. Flettner (A. P. C.), published May 25, 1943.